May 23, 1933. W. D. HOLSENBECK 1,911,118
PRESSURE OPERATED SWITCH
Filed Dec. 15, 1930 2 Sheets-Sheet 2
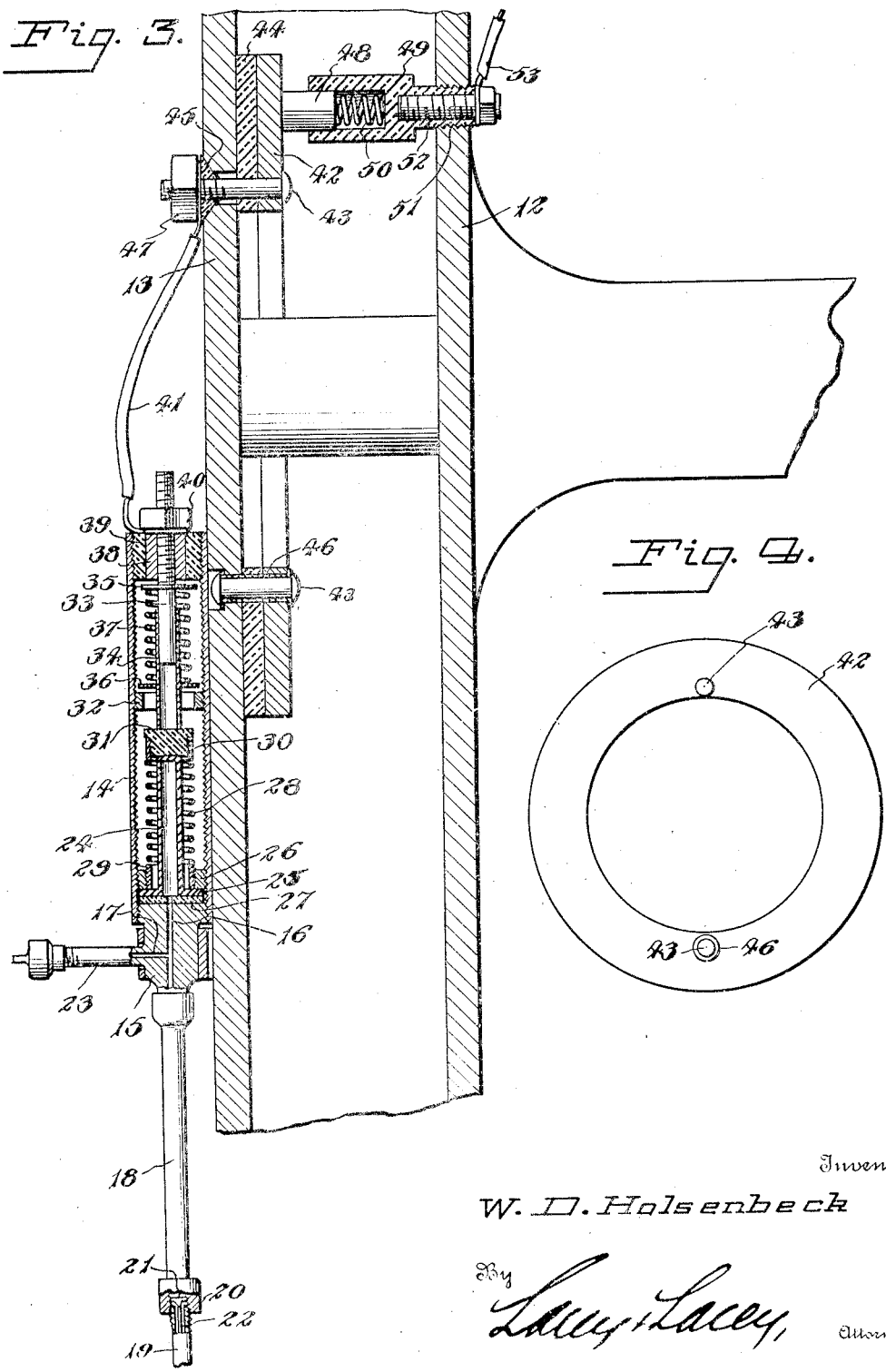
Inventor
W. D. Holsenbeck
By Lacey & Lacey,
Attorneys Patented May 23, 1933

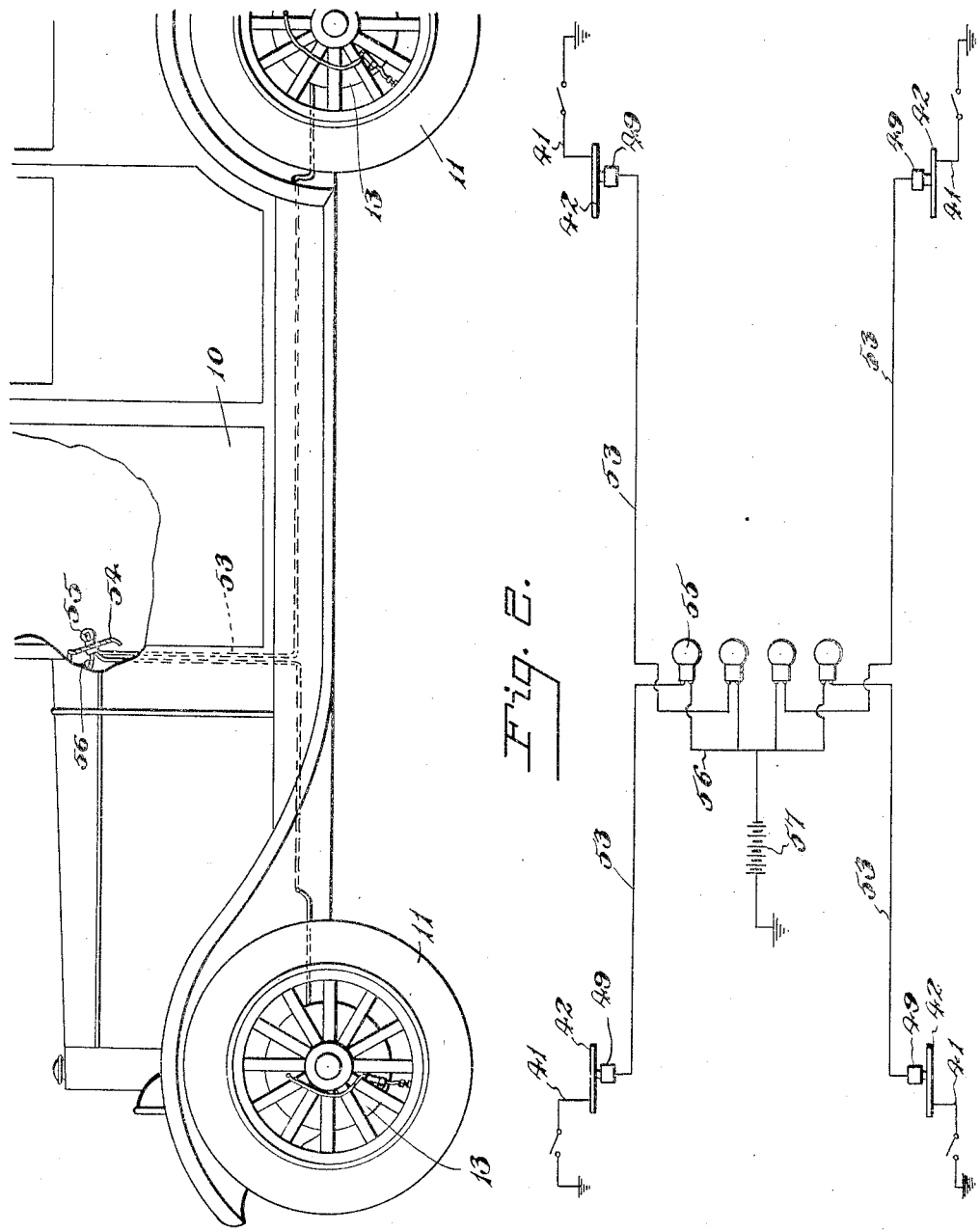

1,911,118

UNITED STATES PATENT OFFICE

WILLIAM D. HOLSENBECK, OF OLNEY, ILLINOIS, ASSIGNOR OF ONE-FIFTH TO JOHN C. HIRSCHFELD, OF CHICAGO, ILLINOIS, AND ONE-FIFTH TO JULIUS J. HIRSCHFELD, OF CHAMPAIGN, ILLINOIS

PRESSURE OPERATED SWITCH

Application filed December 15, 1930. Serial No. 502,509.

This invention relates to automatic tire pressure indicators.

An object of the invention is to provide a switch wihch will be controlled entirely by the pressure within the tire and will automatically close upon a predetermined drop in tire pressure to energize a warning device, such as a lamp located preferably on the instrument board, so that proper pressure may be always maintained in the tires of the vehicle and thus the long life of the tires promoted.

A further object is to provide a pressure control switch which may be located on the brake drum and forms the grounded side of an electric circuit, a brush being mounted on the brake housing and bearing upon a metal ring contact which forms the live side of the circuit, this arrangement of the switch parts being adapted to permit mounting of the device without interfering with any of the automobile parts while at the same time assuring the proper functioning of the parts under the most severe conditions of service.

A still further object of the invention is to provide an automatic switch including a rubber tube open to the pressure within the tire and controlling a spring pressed contact, retraction of the tube, due to a predetermined drop in power pressure, permitting the contact to be moved by its spring and close the circuit to energize the warning lamp.

A still further object is to provide a switch in which the tension of the movable contact controlling spring may be adjusted to set the device to operate under various predetermined tire pressures.

A still further object is to provide an automatic tire pressure indicator which will be formed of a few strong, simple and durable parts which are inexpensive to manufacture and will not easily get out of order.

With the abcve and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a fragmentary side elevation of a motor vehicle equipped with an automatic tire pressure control switch embodying my improvements, Fig. 2 is a diagrammatic view of the electric circuits, switches and warning lamps, Fig. 3 is a longitudinal sectional view through a brake housing and its drum equipped with the automatic switch, and Fig. 4 is a detail elevation of the metal contact ring upon which the brush carried by the brake housing rides.

Referring now to the drawings in which like characters of reference designate similar parts in the various views, 10 designates an automobile, 11 the wheels thereof, 12 the brake housing, and 13 the brake drum, these parts being all of the usual and well known construction.

In carrying out the invention, I provide a tubular switch housing 14 which is preferably internally threaded throughout to accommodate assembling of the switch parts. The housing may be rigidly secured in a radial position on the brake drum 13 in any preferred manner and rotates with the drum.

A plug 15 is threaded into and closes the outer end of the housing. The plug is provided with a longitudinal duct 16 and with a transverse duct 17 opening through the side of the plug and communicating with the longitudinal duct. A rubber tube 18 connects the longitudinal duct with the inflating valve 19 of the tire 11. The tube is equipped with a threaded nut 20 which is screwed onto the valve 19 and carries in its bore an axial lug 21 which is adapted to press down the tire valve stem 22 so that the rubber tube 18 and duct 16 are open to the pressure in the tire. An inflating valve 23 of the usual type is operatively connected to the lateral duct 17 in the plug.

A flexible rubber tube 24 is mounted axially in the bore of the switch housing 14 and is open to the tire pressure through the duct 16. The tube is closed at the inner end and at the outer end is provided with a marginal flange 25 which is clamped by an interiorly and exteriorly threaded nut 26 against a washer 27 disposed on the inner face of the plug 15.

A helical spring 28 surrounds and is spaced from the rubber tube 24. The spring is confined against a tubular seat 29 threaded into the nut 26 and a tubular seat 30 which is threaded onto a plug 31 of insulating material which bears upon the inner closed end of the rubber tube. It will thus be seen that the insulating plug 31 fluctuates, that is, rises and falls under the influence of the pressure in the rubber tube 24, which pressure is exactly the same as the pressure in the tire.

A metal washer 32 is threaded into the switch housing and is grounded to the housing, as will be understood. This washer forms a stationary switch contact.

The movable switch contact comprises a stem 33 and a sleeve 34 which surrounds the stem. A metal collar 35 is formed on the stem and a metal collar 36 is formed on the sleeve. A helical spring 37 surrounds the sleeve and is held under tension between the collars 35 and 36.

The stem is threaded into a metal bushing 38 which is driven into an insulating sleeve 39, which latter is threaded into the inner end of the switch housing 14 and together with the bushing forms a closure for said inner end of the housing. The stem is threaded to receive a nut 40 which performs the dual function of an adjusting nut to vary the tension of the spring 37 and also secures the end of a conductor wire 41 to the stem.

The nut 40 is adjusted to tension the spring 37 so that it balances the tension of the spring 28 plus the upthrust of the insulating plug 31 under the influence of the rubber tube 24 when a desired degree of pressure exists in the tire. Upon a predetermined drop in said pressure, the spring 37 over-balances the pressure of the spring 28 and the decreased thrust of the insulating block 31, due to the retraction of the rubber tube 24, and forces the metal collar 36 into contact with the metal grounded washer 32, thereby closing the circuit at this point. When the circuit is closed, as will presently be described, a warning lamp located on the instrument board is energized to indicate low tire pressure.

By referring now more particularly to Figs. 2 and 4, it will be seen that a ring 42 is secured to the brake drum 13 by means of spaced connectors 43 and rotates as a unit with the drum. The metal ring is insulated from the drum by means of an insulating ring 44. Both connectors are also insulated from the drum, the inner connector employing an insulating conical washer 45 for this purpose, while the outer connector employs an insulating collared sleeve 46 for the purpose. The inner connector is equipped with a nut 47 which secures the conductor wire 41 to the connector. Thus the copper ring 42 is electrically connected to the movable insulated switch contact comprising the stem 33 and the sleeve 34.

A stationary carbon brush 48 rides upon the copper ring 42. The brush is mounted in a holder 49 in which is disposed a helical spring 50 that urges the brush against the ring. The holder is provided with a threaded nipple 51 which is threaded through a suitable opening in the brake housing 12. A set screw 52 is threaded into the nipple and forms means for attaching a conductor wire 53 to the brush.

Referring now more particularly to Figs. 1 and 2, it will be seen that the conductor wires 53 from the vehicle wheels are brought to the instrument board 54. Preferably, four warning lamps 55 are located on the board, one for each tire. Each lamp is preferably a two-terminal lamp, as shown in Fig. 2. The wire 53 from the automatic switch is connected to one terminal. A wire 56 is connected to the other terminal and to the battery 57. Consequently, when low pressure exists in any particular tire, the automatic switch of that tire will be closed, as above described, and the corresponding lamp 55 energized. The lamp will continue to glow until the proper pressure is restored in the tire.

From the above description it is thought that the construction and operation of the invention will be clearly understood without further explanation.

Having thus described the invention, I claim:

A device of the class described, comprising a tubular housing, means for securing the housing to a support, a plug closing one end of the housing, the plug having an axial duct, an air hose carried by the plug and communicating with the duct, a rubber bulb carried by the plug axially within the housing and open to the duct for receiving the air pressure of the hose, a plug closing the opposite end of the housing, a stem carried axially in the housing by the last named plug, a sleeve on the stem, collars on the stem and sleeve, a helical spring surrounding the sleeve and confined under tension by the collars, said stem and sleeve forming a movable switch contact, a collar within the bore of the housing forming a stationary switch contact adapted to be struck by one of the first named collars of the movable switch contact, an abutment between the confronting inner ends of the sleeve and the rubber bulb, a helical spring surrounding said bulb and confined under tension between the first named plug and the abutment, and an adjusting nut carried by the stem externally of the housing for tensioning the first named spring until it balances the tension of the second named spring plus the thrust of said bulb under influence of predetermined air hose pressure.

In testimony whereof I affix my signature.

WILLIAM D. HOLSENBECK. [L. S.]